US009558237B2

(12) United States Patent
Katsav

(10) Patent No.: US 9,558,237 B2
(45) Date of Patent: Jan. 31, 2017

(54) SYSTEMS AND METHODS FOR AUTOMATED COMBINATION AND CONJUGATION OF INDICIA

(71) Applicant: Itay Katsav, Ramat Gan (IL)

(72) Inventor: Itay Katsav, Ramat Gan (IL)

( * ) Notice: Subject to any disclaimer, the term of this patent is extended or adjusted under 35 U.S.C. 154(b) by 226 days.

(21) Appl. No.: 13/868,199

(22) Filed: Apr. 23, 2013

(65) Prior Publication Data
US 2014/0317139 A1    Oct. 23, 2014

(51) Int. Cl.
*G06F 17/30*    (2006.01)
(52) U.S. Cl.
CPC ... *G06F 17/30424* (2013.01); *G06F 17/30259* (2013.01); *G06F 17/30277* (2013.01)
(58) Field of Classification Search
CPC ................................................. G06F 17/30424
See application file for complete search history.

(56) References Cited

U.S. PATENT DOCUMENTS

2012/0124015 A1*  5/2012  Abrams ................. 707/692

* cited by examiner

*Primary Examiner* — Syed Hasan

(57) ABSTRACT

Systems and methods of automated conjugation of indicia are disclosed. The system includes at least one database; a database management system, having a graphical user interface, adapted for running a query search at said database; a storage medium for storing primary indicia objects and secondary indicia objects set, retrieved from the database. The system further includes an algorithmic analysis mapping module, adapted to analyze the primary indicia objects and the secondary indicia objects to generate metadata representative therefore; a matching module adapted to compare the metadata representative of the primary and secondary indicia objects, as well as a conjugating module, adapted to conjugate at least one primary indicia object with at least one secondary indicia object.

18 Claims, 6 Drawing Sheets

SYSTEMS AND METHODS FOR AUTOMATED COMBINATION AND CONJUGATION OF INDICIA

TECHNICAL FIELD

The present invention relates to systems and methods for automated combination and conjugation of indicia.

BACKGROUND ART

It is believed that the pertinent state-of-the-art is represented by: U.S. Pat. No. 7,996,753, and patent applications Ser. No. 2009/0012863, 2009/0132370, US2009/0328113 and 2010/0063878, as well as by international patent application having Pub. No. WO2008/130338.

DEFINITIONS

Indicium and/or indicia as referred to herein inter alia include: text, alphanumeric data and graphical content. It should be understood, however, that the eclectically synopsized definitions supra are not to limit the Invention to the particular forms and examples, but on the contrary, is to cover all modifications, equivalents, and alternatives falling within the scope of the invention.

DESCRIPTION OF THE DRAWINGS

The present invention will be understood and appreciated more comprehensively from the following detailed description taken in conjunction with the appended drawings in which.

Figure 1:
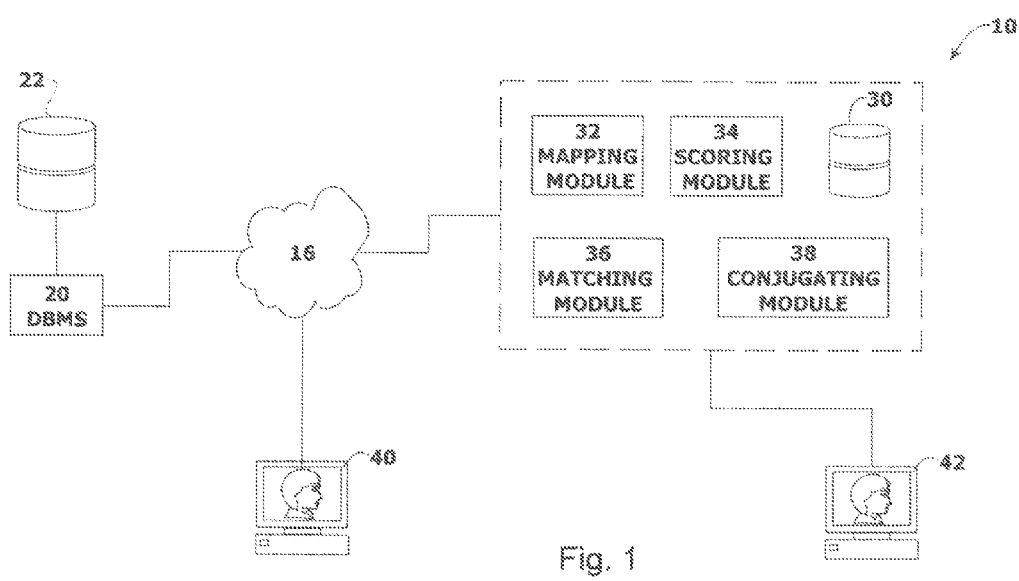
FIG. 1 is a schematics block diagram of an embodiment of the system of the invention implemented for combining graphical indicia.

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DISCLOSURE OF EMBODIMENTS

Illustrative embodiments of the invention are described below. In the interest of clarity, not all features of actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

Figure 2:
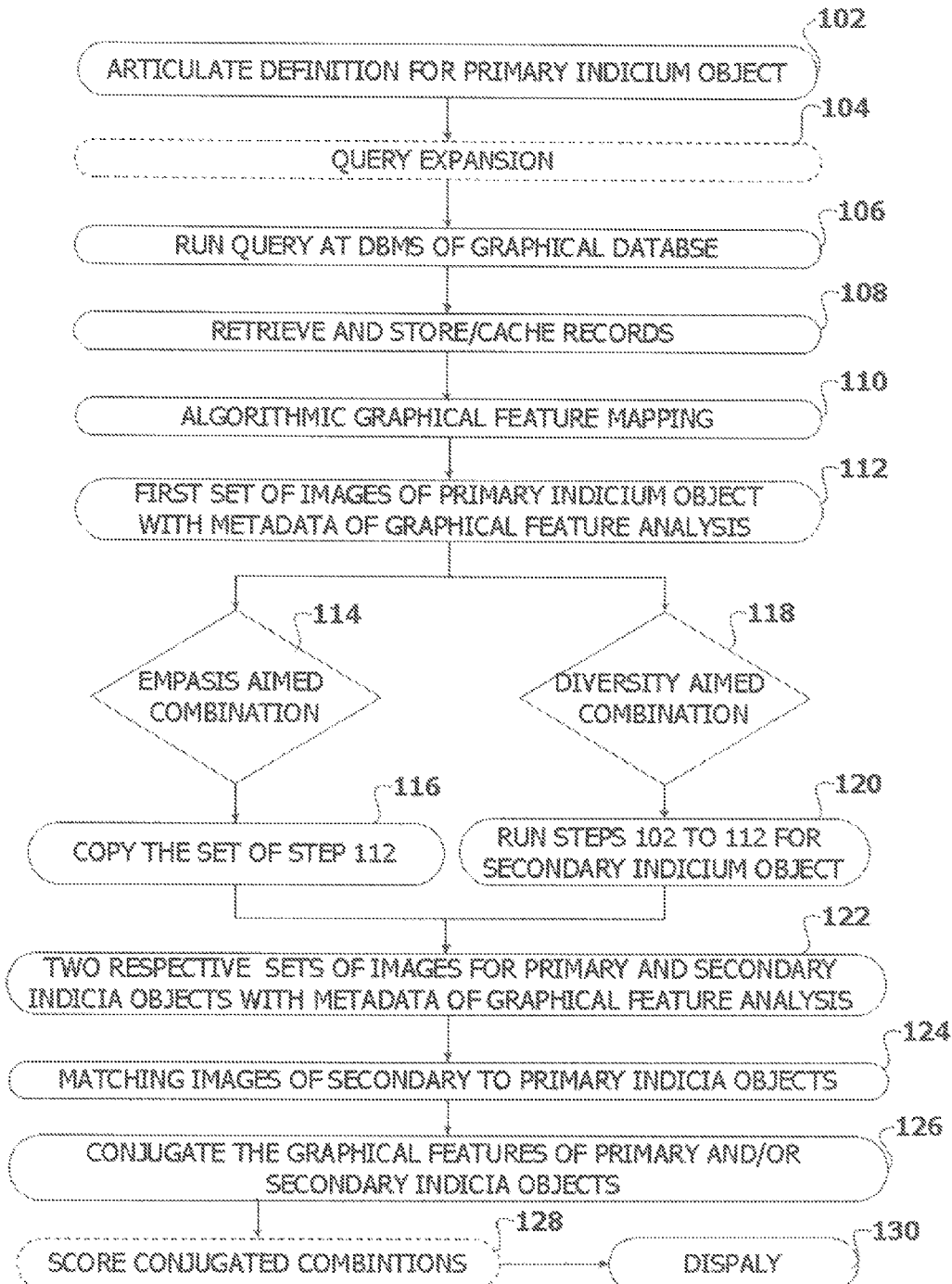
FIG. 2 is a flowchart of an embodiment of the method of the invention implemented for combining graphical indicia.

In accordance with some embodiments of the present invention, implemented for combination of graphical indicia, reference is now made to FIGS. 1 and 2. The method of combination of graphical indicia commences at step 102 with an articulation of the definition of the primary indicium object. In the instance of graphical indicia combination, typically a textual definition of the primary indicium object is articulated. Examples of a textual definition for the primary indicium object may include: tree, children, bread, money, nun, rising sun, etc.

The aforementioned textual definition of the primary indicium object is then used at step 106 as an input search query to at least one database management system (DBMS) 20, of images and/or graphical content database (DB) 22, preferably from web-based graphical user interface (GUI) 40 of system 10 and/or from a dedicated GUI 42 thereof. Preferably the aforementioned definition of the primary indicium object is initially subjected to the processing of a query expansion algorithm during step 104; such as the query expansion algorithm of PATENTSCOPE, available from WIPO, at: www.wipo.int/patentscope/en/ or query expansion algorithm implemented in DBMSs of images and/or graphical content databases, IMAGEBANK, ISTOCKPHOTO or any other databases of graphical content.

Upon running the query, preferably from web-based graphical user interface (GUI) 40 of system 10 and/or from a dedicated GUI 42 thereof, the search engine of DBMS 20 returns a list of records in the database 22 which correspond to the definition of the primary indicium object. The representative image or images of a smaller size or lesser quality are then retrieved from DBMS 20 of DB 22 and via LAN 16 and cached or stored at storage medium 30 of system 10 of the present invention, during step 108.

After retrieving representative images of the primary indicium object from DBMS 20 of DB 22 and via LAN 16 and caching/storing them at storage medium 30, these retrieved images are subjected to an algorithmic analysis by graphical feature mapping module 32 of system 10, during step 110. The algorithmic analysis by graphical feature mapping module 32 of system 10, performed at step 110, alternatively or additionally includes converting the graphical features of pixified images into vector images and storing their vectorial data alongside the graphical file, as metadata.

Figure 3A:
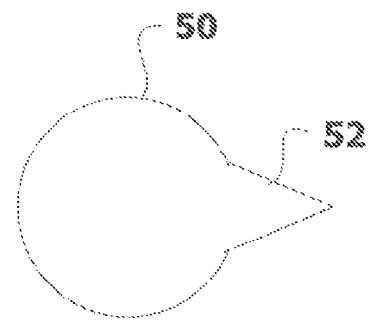
FIG. 3A to 3C are schematic illustrations of exemplary graphical indicia.
Figure 3B:
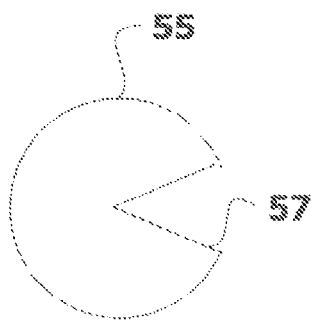
Figure 3C:
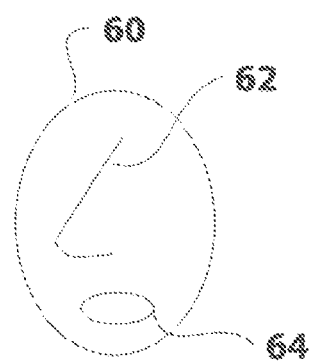

In order to exemplify a process of algorithmic analysis of graphical feature mapping, performed during step 110 by mapping module 32, reference is now made to FIG. 3A to 3C. Exemplary image of primary indicium object, shown in FIG. 3A, includes a substantially circular or elliptic contour 50, with protruding extension 52. The algorithmic graphical feature mapping analysis in such case is to recognize that: a) circular or elliptic contour 50 as the major feature of the object; and b) classify contour 50 as circular or elliptic; thereby allowing to search for a secondary indicium object of a complimentary shape in a dedicated manner, as elaborated infra.

Exemplary image of primary indicium object, shown in FIG. 3B, includes a substantially circular or elliptic contour 55, with penetrating feature 57. The algorithmic graphical feature mapping analysis in such case is to recognise that: a) circular or elliptic contour 55 as the major feature of the object; and b) classify contour 55 as circular or elliptic.

Exemplary image of primary indicium object, shown in FIG. 3C, includes a substantially circular or elliptic contour 60, open curvy line 62 and closed minor contour 64. The algorithmic graphical feature mapping analysis in such case is to recognize that: a) circular or elliptic contour 60 as the major feature of the object, and b) classify contour 60 as circular or elliptic. The algorithmic graphical feature mapping analysis is preferably to further recognize that: a) an open-end line 62 exists; b) open-end line 62 is not the major feature of the object; and c) open-end line 62 as an open-end line of a not straight shape. The algorithmic graphical feature mapping analysis is preferably to still further recognize that: a) a closed minor contour 64 exists; b) minor contour 64 is not the major feature of the object; and c) minor contour 64 as a closed circular or elliptic shape.

Referring back to FIGS. 1 and 2, after algorithmic analysis by graphical feature mapping module 32 of representative images of the primary indicium object, during step 110, is completed, the first set of images of primary indicium object, with metadata of graphical feature analysis is stored in database 30 of system 10, at step 112, and the method of the invention proceeds to the steps of finding the secondary indicium object, of a complimentary or matching shape.

There are several options of providing the set of images or graphical content files, from which secondary indicium object is thereafter selected. In some embodiments, particularly when a combination of two indicia objects are preferably to represent substantially different things and a variety aimed combination is desired, at step 118, an additional definition for the secondary indicium object is articulated, in step 120 and steps 102 to 112 then repeated for the secondary indicium object. DBMS 20, of images and/or graphical content database (DB) 22, as in step 106, may be employed, preferably from web-based GUI 40 of system 10 and/or from a dedicated GUI 42 thereof. Preferably the aforementioned definition of the secondary indicium object is initially subjected to the processing of a query expansion algorithm during, as in step 104.

In such a case, upon running the query, the search engine returns a list of records in the database 22 which correspond to the definition of the secondary indicium object. The representative image or images of a smaller size or lesser quality are then retrieved from DBMS 20 of DB 22 and via LAN 16 and cached or stored at storage medium 30 of system 10 of the present invention, as in during step 108. This second set of images stored at storage medium 30 is then optionally used as a pool of images from which the secondary indicium object is selected.

In other embodiments, particularly when an emphasis on a single thing is desired, the secondary indicium object is optionally selected from the very same set of images for primary indicium object, in step 114. The set of images processed by algorithmic analysis of graphical feature mapping module 32, representative of the primary indicium object, during step 110, is copied during step 116 and then is used as the set of images for the secondary indicium object.

After the source of the images is chosen, the representative images of the second set, namely images of the secondary indicium object, or images of a smaller size or lesser quality thereof are retrieved from DBMS 20 of DB 22 and via LAN 16 and cached or stored at storage medium 30 of system 10 of the present invention, as in step 108. These images are then further subjected to an algorithmic analysis by graphical feature mapping module 32 of system 10, as in step 110. In the case of the primary and secondary indicia objects are selected from the same set, the same set is copied, in step 118. Accordingly there are two sets, different or identical, of images with metadata of graphical feature mapped by algorithmic analysis, respectively representing the primary and secondary indicia objects, at step 122

Thereafter, the operator selects preferably from web-based GUI 40 of system 10 and/or from a dedicated GUI 42 thereof the desired conjugation type. In a non-limiting manner, in embodiments where an emphasis aimed combination is desired, the conjugation type of a choice may be: superposition, vertical alignment, other type of alignment, surrounding enclosure: whereas in embodiments where a variety aimed combination is desired, the conjugation type of a choice may be: continuum, various symmetrical relations, surrounding enclosure, etc. In some preferred embodiments, however, there is no selection of conjugation type is performed and matching module 36 of system 10 as well as conjugating module 38 thereof, in turn, iteratively run steps of matching 124 and conjugating 126, for every conjugation type predefined in system 10, as elaborated infra.

Typically one-by-one the metadata of graphical features mapping of images from the first set, representing the primary indicium object, is matched for compatibility to the metadata of graphical features mapped by algorithmic analysis of images from the second set, representing the secondary indicium object, by matching module 36 of system 10, at step 124. The process of matching at step 124 performed by module 36 of system 10, exemplary comprises:
 a) selecting the metadata of graphical features mapping of a single image from the first set;
 b) screening the metadata of graphical features mapping of the images from the second set;
 c) scaling up/down the vectorial map of the images;
 d) determining the pairs of images from the first and second sets, the metadata of which exhibits a relatively higher similarity.

After determining the best candidate pairs of images from the first and second sets, conjugating module 38 of system 10, conjugates the graphical features of the image of the primary indicium indicium object from the first set, with the graphical features of the images of the secondary indicium object from the second set, optionally in accordance with a conjugation type predetermined ahead, at step 126, to form a chimeric and relatively united image of the primary and the secondary indicia objects, combined together.

The process of conjugating at step 126 performed by module 38 of system 10, inter alia includes:
 a) scaling up/down the major features of the images;
 b) rotating and flipping the major features of the images;
 c) conjugating the minor features of the images, typically by adjusting their geometry for a superposition or continuum;
 d) performing colour adjustment to form a relatively uniform gradient.

Figure 4C:
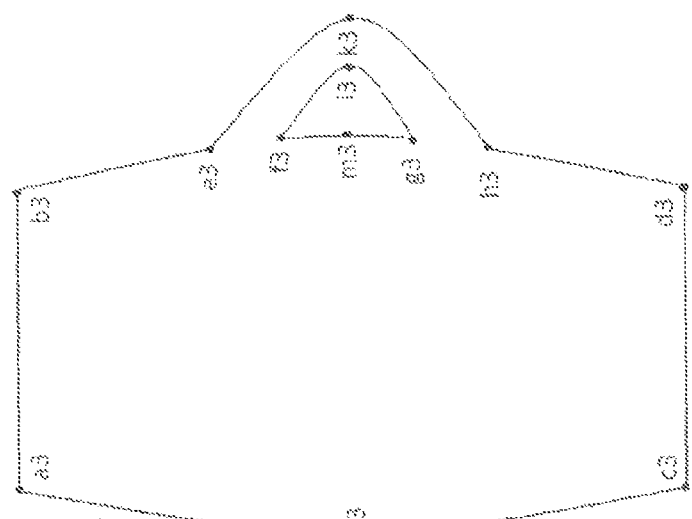
FIG. 4A to 4C are schematic illustrations of exemplary graphical indicia.
Figure 4B:
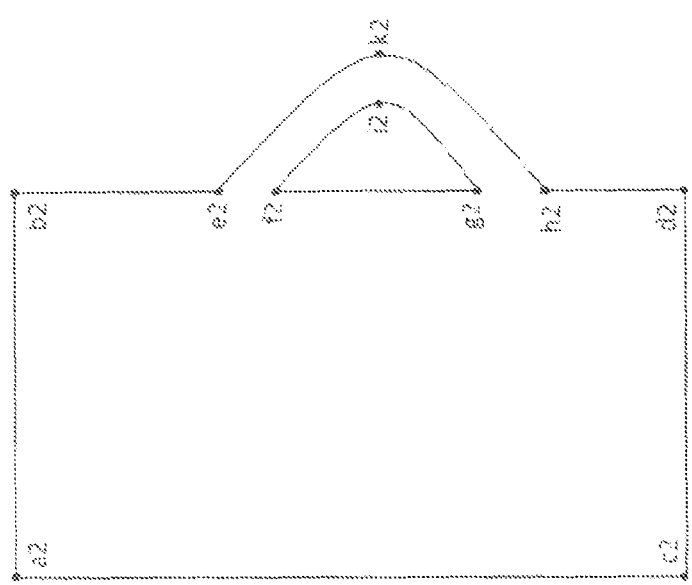
Figure 4A:
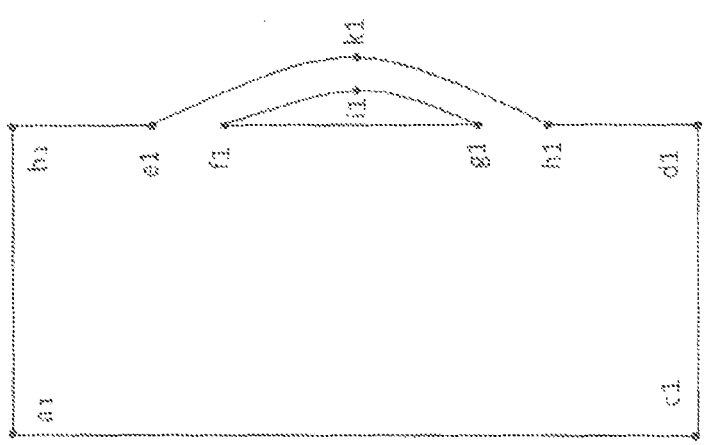
Figure 5A:
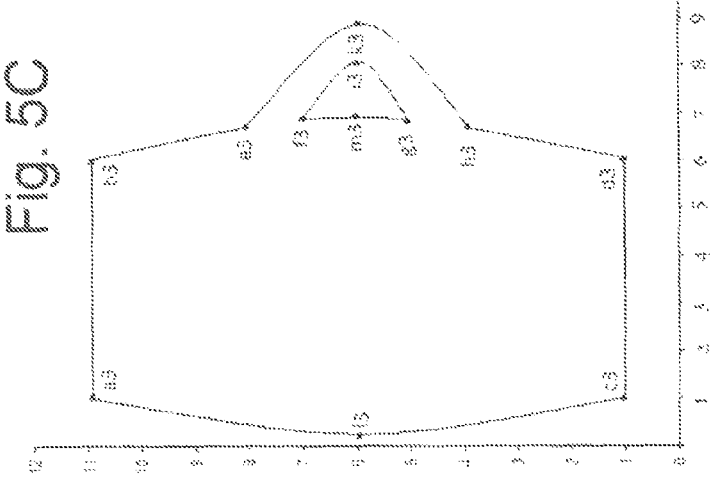
FIG. 5A to 5C are schematic exemplary illustrations scaled up/down indicia show in FIG. 4A to 4C.
Figure 5B:
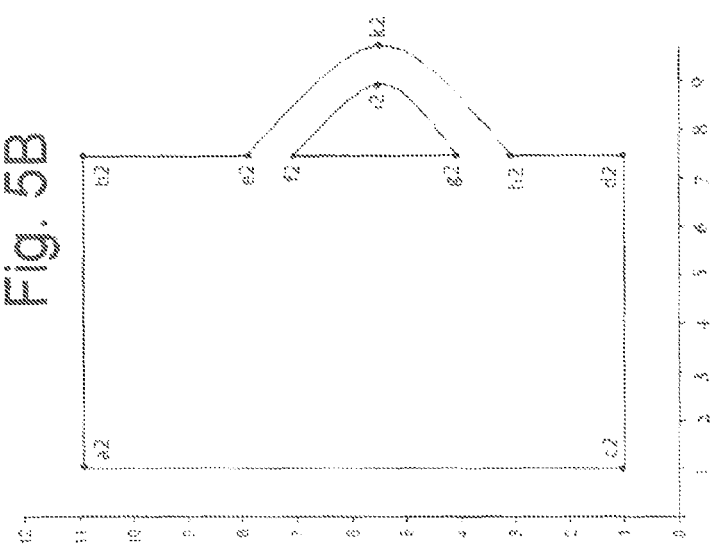
Figure 5C:
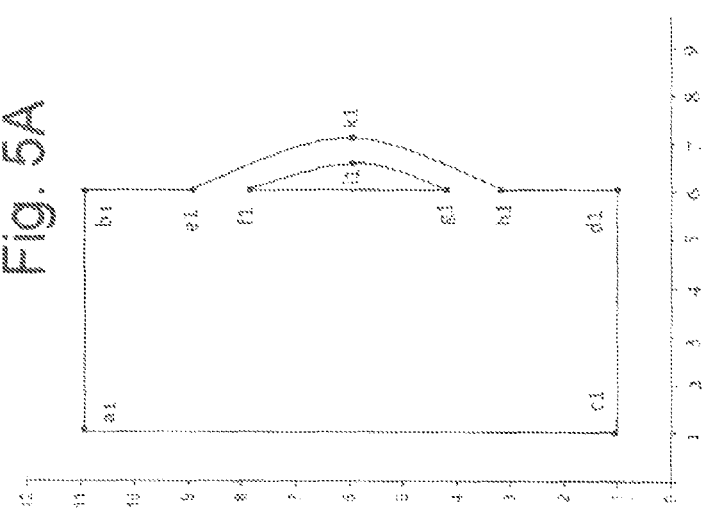

In order to exemplify a process of scaling up/down the major features of the images, performed during step 126 by module 38, reference is now made to FIG. 4A to 5C. Exemplary image of primary and/or secondary indicium object, shown in FIG. 4A, is the smallest of the indicia objects shown through FIG. 4A to 4C; whereas indicia objects shown in FIGS. 4B and 4C are, respectively, the medium-sized and the largest of the indicia objects shown through FIG. 4A to 4C. The process of scaling up/down the major features of the images shown through FIG. 4A to 4C would result the scaled images shown, respectively, through FIG. 5A to 5C, wherein the major features of the images are scaled to assume substantially the same size.

Figure 6A:
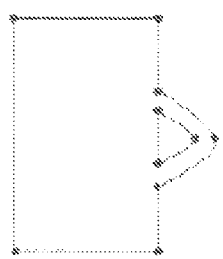
FIG. 6A to 6C are schematic exemplary illustrations of combination of minor features by overlapping.
Figure 6B:
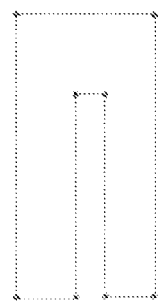
Figure 6C:
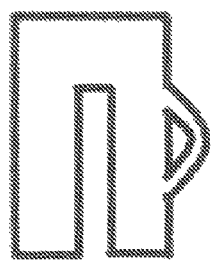

In order to exemplify a process of conjugating the minor features of the images by superposition, performed during step 128 by module 38, reference is now made to FIG. 6A to 6C. Exemplary image of indicium object, shown in FIG. 6A, which can represent a glass of draught beer, is combined with the image of indicium object, shown in FIG. 6B, which can represent a pair of jeans, to yield a chimeric and united image, shown in FIG. 6C, wherein both indicia objects of FIGS. 6A and 6B are combined together and the minor features thereof are conjugated by superposition.

The results of the process of conjugation of the images, performed during step 126 by module 38, are then optionally scored according to a predetermined scale, during step 128, by module 34, to identify the most successful combinations. The resulting images of combined and conjugated indicia objects are ultimately displayed to the operator, during step 130, preferably on web-based GUI 40 of system 10 and/or on dedicated GUI 42 thereof. Optionally solely the combinations with a score exceeding a predetermined threshold value are displayed to the operator, during step 130.

Referring now mutatis mutandis back to FIGS. 1 and 2, in accordance with some embodiments, the present invention is implemented for combination of alphanumerical and/or textual indicia. The method of combination of alphanumerical indicia/textual commences at step 102 with a definition of the primary indicium object. Examples of a definition for the primary alphanumerical indicium object typically are a single string of characters, such as: 757, Google, B52, money, $, doctor, sun, etc.

The aforementioned definition of the primary indicium object is then used at step 106 as an input search query to at least one database management system (DBMS) 20, of thesaurus database (DB) 22, preferably from web-based graphical user interface (GUI) 40 of system 10 and/or from a dedicated GUI 42 thereof. Preferably the phonetic script of the aforementioned definition of the primary indicium object is retrieved by DBMS 20, of phonetic script database (DB) 22.

The set of variations and/or synonymous words and/or phonetic scripts thereof of the primary indicium object stored in database 30 of system 10, at step 112, and the method of the invention proceeds to the steps of finding the secondary indicium object, of a complimentary or matching qualities.

In some embodiments, particularly when a combination of two indicia objects are preferably to represent substantially different things and a variety aimed combination is desired, at step 118, an additional definition for the secondary indicium object is articulated, in step 120 and steps 106 and 112 then repeated for the secondary indicium object. DBMS 20, of thesaurus and/or phonetic script database (DB) 22, as in step 106, is typically employed, preferably from web-based GUI 40 of system 10 and/or from a dedicated GUI 42 thereof.

The set of variations and/or synonymous words and/or phonetic scripts thereof of the secondary indicium object stored in database 30 of system 10, at step 122. Accordingly there are two sets of primary and secondary indicia objects are formed, at step 122.

Thereafter, optionally the conjugation type is selected. The conjugation type of a choice may be: insertion, suffix extension, prefix addition, superposition, characters alignment, characters overlapping, phonetic overlapping and phonetic similarity overlapping. In some preferred embodiments, however, there is no selection of conjugation type is performed and matching module 36 of system 10 as well as conjugating module 38 thereof, in turn, iteratively run steps of matching 124 and conjugating 126, for every conjugation type predefined in system 10.

Typically the characters of the items from the first set and/or phonetic scripts thereof, representing the primary indicium object, is matched for compatibility to the characters of the items from the first set and/or phonetic scripts thereof, representing the secondary indicium object, by matching module 36 of system 10, at step 124. The process of matching at step 124 performed by module 36 of system 10, exemplary comprises:
  a) selecting the characters of the items from the first set and/or phonetic scripts thereof;
  b) screening the characters of the items and/or phonetic scripts thereof from the second set;
  c) determining the pairs of items from the first and second sets, the characters and/or phonetic scripts of which exhibits a relatively higher similarity, at least partially.

After determining the best candidate pairs of items from the first and second sets, conjugating module 38 of system 10, conjugates the characters of the primary indicium object from the first set, with the characters of the secondary indicium object from the second set, optionally in accordance with a conjugation type predetermined ahead, at step 126, to form a chimeric expression of the primary and the secondary indicia objects, combined together.

In order to exemplify a process of conjugating at step 126 performed by module 38 of system 10, in accordance with conjugation type of phonetic similarity overlapping, reference is now made to an example of combination of primary indicium object, which is defined as "protozoa", with secondary indicium object, which is defined as "visual". The definition of primary indicium object "protozoa" should provide with the term "parasite" at step 106; whereas the definition "visual" should inter alia return the term "sight". Thereafter the term "parasite" and the term "sight" can be conjugated a into chimeric expression "parasight" of the primary and the secondary indicia objects, combined together. The chimeric expression "parasight" can be achieved by a conjugation type of phonetic similarity overlapping and/or characters overlapping with insertion/s.

The results of the process of conjugation, performed during step 126 by module 38, are then optionally scored according to a predetermined scale, during step 128, by module 34, to identify the most successful combinations. The resulting combined and conjugated indica objects are ultimately displayed to the operator, during step 130, preferably on web-based GUI 40 of system 10 and/or on dedicated GUI 42 thereof. Optionally solely the combinations with a score exceeding a predetermined threshold value are displayed to the operator, during step 130.

It will be appreciated by persons skilled in the art that the present invention is not limited by what has been particularly shown and described herein above. Rather the scope of the invention is defined by the claims which follow:

The invention claimed is:

1. A method of automated conjugation of indicia, said method comprises:
  (1) articulating a definition for a primary indicium object;
  (2) inputting said definition for said primary indicium object as a search query in at least one database, wherein said database is selected from the group consisting of: images database, graphical content database, alphanumerical content database, textual database, dictionary database, thesaurus database and phonetic database;
  (3) retrieving a plurality of primary indicia objects corresponding to said definition for said primary indicium object, found at said search in said database;

(4) subjecting said plurality of said primary indicia objects retrieved from said database to an algorithmic analysis by a mapping module, wherein said algorithmic analysis performed by said mapping module generates respective metadata of said primary indicia objects;

(5) storing said respective metadata of said algorithmic analysis of said plurality of said primary indicia objects;

(6) articulating a definition for a secondary indicium object;

(7) inputting said definition for said secondary indicium object as a search query in at least one database, wherein said database is selected from the group consisting of: images database, graphical content database, alphanumerical content database, textual database, dictionary database, thesaurus database and phonetic database;

(8) retrieving a plurality of secondary indicia objects corresponding to said definition for said primary indicium object, found at said search in said database;

(9) subjecting said plurality of indicia objects retrieved from said database to an algorithmic analysis by a mapping module, wherein said algorithmic analysis performed by said mapping module generates respective metadata of said primary secondary objects;

(10) storing said metadata of said algorithmic analysis of said plurality of said secondary indicia objects;

(11) selecting at least one desired conjugation type, wherein said conjugation type is selected from the group consisting of: superposition, vertical alignment, lateral alignment, surrounding enclosure, continuum, symmetrical relation;

(12) matching for compatibility said respective metadata of said algorithmic analysis of said primary indicia objects, with said respective metadata of said algorithmic analysis of said secondary indicia objects;

(13) selecting at least one indicium object from said plurality of said primary indicia objects, said respective metadata of which exhibits an essentially high similarity to said respective metadata of at least one indicium object from said plurality of said secondary indicia objects;

(14) conjugating said at least one indicium object selected from said plurality of said primary indicia objects, with said at least one indicium object selected from said plurality of said secondary indicia objects, said metadata of which was found to exhibit said essentially high similarity, in accordance with said conjugation type;

whereby a chimeric and united conjugate of said at least one indicium object selected from said plurality of said primary indicia objects with said at least one indicium object selected from said plurality of said secondary indicia objects is generated.

2. The method of automated conjugation of indicia, as set forth in claim 1, wherein said definition for said primary indicium object is essentially identical to said definition for a said secondary indicium object.

3. The method of automated conjugation of indicia, as set forth in claim 1, wherein said primary indicia objects are essentially identical to said secondary indicia objects.

4. The method of automated conjugation of indicia, as set forth in claim 1, wherein said steps of:

(1) articulating a definition for said primary indicium object;

(2) inputting said definition for said primary indicium object as a search query in at least one database;

(3) retrieving a plurality of primary indicia objects corresponding to said definition for said primary indicium;

are, respectively, essentially identical to said steps of:

(4) articulating a definition for said secondary indicium object;

(5) inputting said definition for said secondary indicium object as a search query in at least one database;

(6) retrieving a plurality of secondary indicia objects corresponding to said definition for said primary indicium.

5. The method of automated conjugation of indicia, as set forth in claim 1, wherein said search query is initially subjected to a processing of a query expansion algorithm.

6. The method of automated conjugation of indicia, as set forth in claim 1, further comprises converting graphical features of raster images into vector images and storing a resulting vectorial map as metadata thereof.

7. The method of automated conjugation of indicia, as set forth in claim 1, wherein said algorithmic analysis is configured for mapping at least one graphical feature of at least one indicia object selected from the group consisting of: at least one indicia object from said plurality of said primary indicia objects and at least one indicia object from said plurality of said secondary indicia objects, said at least one graphical feature is selected from the group consisting of: a closed contour in said at least one indicia object, a major feature of said at least one indicia object, an open-end line in said at least one indicia object, minor feature of aid at least one indicia object.

8. The method of automated conjugation of indicia, as set forth in claim 1, wherein said matching further comprises at least one step selected from the group consisting of:

(1) selecting metadata of a single primary indicium objects;

(2) screening said metadata of mapping of said secondary indicia objects;

(3) scaling up a vectorial map of said primary indicia objects;

(4) scaling up a vectorial map of said indicia objects;

(5) scaling down a vectorial map of said primary indicia objects;

(6) scaling down a vectorial map of said secondary indicia objects;

(7) determining at least one proportion between lengths of lines of said primary indicia objects;

(8) determining at least one proportion between lengths of lines of said secondary indicia objects;

(9) determining at least one proportion between distances between at least two vertices in said primary indicia objects;

(10) determining at least one proportion between distances between at least two vertices in said secondary indicia objects.

9. The method of automated conjugation of indicia, as set forth in claim 1, wherein said conjugating comprises at least one step selected from the group consisting of:

(1) scaling up said primary indicia objects;

(2) scaling up said secondary indicia objects;

(3) scaling down said primary indicia objects;

(4) scaling down said secondary indicia objects;

(5) rotating said primary indicia objects;

(6) rotating said secondary indicia objects;

(7) flipping said primary indicia objects;

(8) flipping said secondary indicia objects;

(9) scaling up major features of said primary indicia objects;

(10) scaling up major features of said secondary indicia objects;
(11) scaling down major features of said primary indicia objects;
(12) scaling down major features of said secondary indicia objects;
(13) rotating major features of said primary indicia objects;
(14) rotating major features of said secondary indicia objects:
(15) flipping minor features of said primary indicia objects;
(16) flipping minor features of said secondary indicia objects;
(17) adjusting geometry of major features of said primary indicia objects;
(18) adjusting geometry of major features of said secondary indicia objects;
(19) superpositioning major features of said primary indicia objects over major features of said secondary indicia objects;
(20) forming a continuum between major features of said primary indicia objects and major features of said secondary indicia objects;
(21) superpositioning minor features of said primary indicia objects over minor features of said secondary indicia objects;
(22) forming a continuum between minor features of said primary indicia objects and minor features of said secondary indicia objects;
(23) performing colour adjustment.

10. The method of automated conjugation of indicia, as set forth in claim 1, wherein said indicia objects are textual or alphanumeric.

11. A system for automated conjugation of indicia, said system comprises:
(1) at least one database, said database is selected from the group consisting of: images database, graphical content database, alphanumerical content database, textual database, dictionary database, thesaurus database and phonetic database;
(2) a database management system of said database, comprising a graphical user interface, configured for running a search query at said database;
(3) a storage medium for storing primary indicia objects and secondary indicia objects set, retrieved from said database;
(4) an algorithmic analysis mapping module, configured to analyze said primary indicia objects and said secondary indicia objects, said algorithmic analysis mapping module is configured to generate of said primary indicia objects and respective metadata of said secondary indicia objects;
(5) a matching module, configured to compare said respective metadata of said primary indicia objects relative to said respective metadata of said secondary indicia objects and to select at least one S a indicium object from said plurality of said primary indicia objects, said respective metadata of which exhibits an essentially high similarity to said respective metadata of at least one secondary indicium object from said plurality of said secondary indicia objects;
(6) a conjugating module, configured to conjugate said at least one primary indicia object with said at least one secondary indicia object, said metadata of which was found to exhibit said essentially high similarity;

wherein said matching module is configured for performing at least one operation selected from the group consisting of:
a) scaling up a vectorial map of said primary indicia objects;
b) scaling down a vectorial map of said secondary indicia objects;
c) determining at least one proportion between lengths of lines said primary indicia objects;
d) determining at least one proportion between lengths of lines said secondary indicia objects;
e) determining at least one proportion between distances between at least two vertices in each of said primary indicia objects;
f) determining at least one proportion between distances between at least two vertices in each of said secondary indicia objects.

12. The system for automated conjugation of indicia, as set forth in claim 11, wherein said system comprises a query expansion module.

13. The system for automated conjugation of indicia, as set forth in claim 11, further comprises a scoring module, adapted to score a plurality of conjugations produced by said conjugating module according to a predetermined scale.

14. The system for automated conjugation of indicia, as set forth in claim 11, wherein said algorithmic analysis mapping module is adapted for converting graphical features of raster images into vector images.

15. The system for automated conjugation of indicia, as set forth in claim 11, wherein said primary indicia objects are essentially identical to said secondary indicia objects.

16. The system for automated conjugation of indicia, as set forth in claim 11, wherein said algorithmic analysis mapping module is configured for mapping at least one graphical feature of at least one indicia object selected from the group consisting of: at least one indicia object from said primary indicia objects and at least one indicia object from said secondary indicia objects, said at least one graphical feature is selected from the group consisting of: a closed contour in said at least one indicia object, a major feature of said at least one indicia object, an open-end line in said at least one indicia object, a minor feature of said at least one indicia object.

17. The system for automated conjugation of indicia, as set forth in claim 11, wherein said conjugating module is adapted for performing at least one selected from the group consisting of:
(1) scaling up said primary indicia objects;
(2) scaling up said secondary indicia objects;
(3) scaling down said primary indicia objects;
(4) scaling down said secondary indicia objects;
(5) rotating said primary indicia objects;
(6) rotating said secondary indicia objects;
(7) flipping said primary indicia objects;
(8) flipping said secondary indicia objects;
(9) scaling up major features of said primary indicia objects;
(10) scaling up major features of said secondary indicia objects;
(11) scaling down major features of said primary indicia objects;
(12) scaling down major features of said secondary indicia objects;
(13) rotating major features of said primary indicia objects;
(14) rotating major features of said secondary indicia objects;

(15) flipping minor features of said primary indicia objects;
(16) flipping minor features of said secondary indicia objects;
(17) adjusting geometry of major features of said primary indicia objects;
(18) adjusting geometry of major features of said secondary indicia objects;
(19) superpositioning major features of said primary indicia objects over major features of said secondary indicia objects;
(20) forming a continuum between major features of said primary indicia objects and major features of said secondary indicia objects;
(21) superpositioning minor features of said primary indicia objects over minor features of said secondary indicia objects;
(22) forming a continuum between minor features of said primary indicia objects and minor features of said secondary indicia objects;
(23) performing colour adjustment.

18. The system for automated conjugation of indicia, as set forth in claim 11, wherein at least one of said indicia objects is textual or alphanumeric.

\* \* \* \* \*